United States Patent [19]

Nitti

[11] Patent Number: 5,788,203
[45] Date of Patent: Aug. 4, 1998

[54] COMPUTER MOUSE PADS

[76] Inventor: John A. Nitti, 804 Ambriance, Burr Ridge, Ill. 60521-0808

[21] Appl. No.: 640,186

[22] Filed: Apr. 30, 1996

[51] Int. Cl.6 .................................................. A47G 29/00
[52] U.S. Cl. ................... 248/346.01; 248/918; 345/163; 428/317.1; 442/30
[58] Field of Search ................... 248/346.01, 918, 248/118, 118.1; 345/163; 428/317.1; 442/30

[56]     References Cited

U.S. PATENT DOCUMENTS

| | | |
|---|---|---|
| 4,281,762 | 8/1981 | Hattemer . |
| 4,488,922 | 12/1984 | Instance . |
| 4,504,348 | 3/1985 | Instance . |
| 4,764,238 | 8/1988 | Dastin et al. ............ 428/317.1 X |
| 4,799,054 | 1/1989 | House ........................... 345/163 |
| 4,888,078 | 12/1989 | Instance . |
| 4,894,106 | 1/1990 | Instance . |
| 4,899,512 | 2/1990 | DeGooyer ....................... 442/30 X |
| 4,933,043 | 6/1990 | Instance . |
| 5,217,781 | 6/1993 | Kuipers ......................... 345/163 X |
| 5,405,168 | 4/1995 | Holt ................................... 281/2 |

OTHER PUBLICATIONS

The Indigo Omnius Digital Offset Color Press brochure, 1995.

Primary Examiner—Derek J. Berger
Attorney, Agent, or Firm—Greer, Burns & Crain, Ltd.

[57]     ABSTRACT

A pad for a computer mouse includes a substrate of cushion sponge of a predetermined shape and size, a layer of nylon netting glued to one side of the substrate, and a layer of paper adhered to the glue and netting. Adhesive is placed on the outer surface of the paper, and a piece of pre-printed synthetic sheet material is adhered to the adhesive. A coating of polymer may be placed over the synthetic material, if desired.

2 Claims, 2 Drawing Sheets

COMPUTER MOUSE PADS

This invention relates to pads used with a computer mouse, and more particularly, to computer mouse pads which have a printed image and lay flat on a surface, without curling.

BACKGROUND OF THE INVENTION

Many computers have an external device called a "mouse" which allows a computer user to select icons and the like on a computer screen. The mouse usually has a rolling ball which is preferably placed on a flat surface. However, a suitable surface preferably has enough friction to roll the ball accurately as the mouse is moved about the surface, but not so much friction that the mouse is difficult to move.

Specially made mouse pads are often used for this purpose. While the pads can be made of many materials, pliable materials with some cushion are popular. For example, mouse pads are available which are made of rubber-like material. A piece of sheet-like material such as paper can be adhered to a surface of the rubber so that the mouse ball rolls easily on the pad.

There is a consumer demand for mouse pads which have printed images. Images have been printed on the paper of conventional mouse pads, but the printed paper has a tendency to shrink, causing the mouse pad to curl. Also, the paper must be printed in high volume for economic reasons, which limits the ability to supply a variety of images in low production runs. Thus, there is a need for computer mouse pads which do not tend to curl. There is also a need for mouse pads having two different materials adhered to each other, with images printed on one of the materials, which can be economically printed with different images in low production runs.

Accordingly, one object of this invention is to provide new and improved mouse pads and methods for making mouse pads.

Another object is to provide new and improved mouse pads having printed images on paper which do not have a tendency to curl.

Still another object is to provide new and improved mouse pads which can be economically printed with different images in low production runs.

SUMMARY OF THE INVENTION

In keeping with one aspect of this invention, a pad for a computer mouse includes a substrate of cushion sponge of a predetermined size having a layer of nylon netting glued to one side of the substrate. Paper such as GRC-700 paper is secured to the glue over the netting. A synthetic printing sheet is secured to the GRC-700 paper by pressure sensitive adhesive which is provided on the side of the GRC-700 paper opposite the side which is secured to the netting. The synthetic printing sheet has a printed image. A polymer coating can be placed over the synthetic printing sheet, if desired.

The mouse pad is made by printing a succession of images on a roll of the synthetic printing sheet material, and placing the roll of material on a first reel. A computer-controlled computer is used so that the image can be changed often easily.

In another part of the process, a roll of GRC-700 paper is coated with pressure sensitive adhesive, which is then covered with removable peel-back material. The GRC-700 paper sub-assembly is rolled onto a second reel.

In still another part of the process, nylon netting is glued to a roll of the cushion sponge, and the GRC-700 paper sub-assembly is drawn from the second reel and placed over the netting, with the peel-back material on the side opposite the netting. The GRC-700 paper is secured to the glue through the nylon netting. The married material is then placed on a third reel.

In yet another part of the process, the third reel is unrolled and the peelback paper is removed. The first reel is also unrolled and the printed paper is pressed onto the pressure sensitive adhesive and married material as the first and third reels are unrolled. The combined material is then cut into a plurality of rough-cut mouse pads having a printed image on each pad. The mouse pads can be laminated or coated with poly coat, if desired. They are then die-cut to a desired size.

BRIEF DESCRIPTION OF THE DRAWINGS

The above-mentioned and other features of this invention and the manner of obtaining them will become more apparent, and the invention itself will be best understood by reference to the following description of several embodiments of the invention taken in conjuction with the accompanying drawings in which.

DETAILED DESCRIPTION

Figure 1:
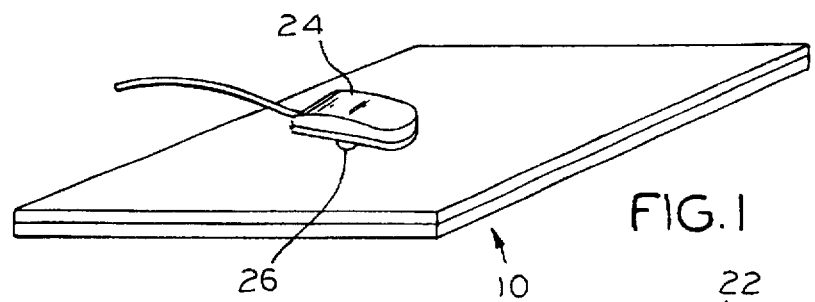
FIG. 1 is a perspective view of a computer mouse pad made in accordance with the principles of this invention, shown with a mouse on the pad.
Figure 2:
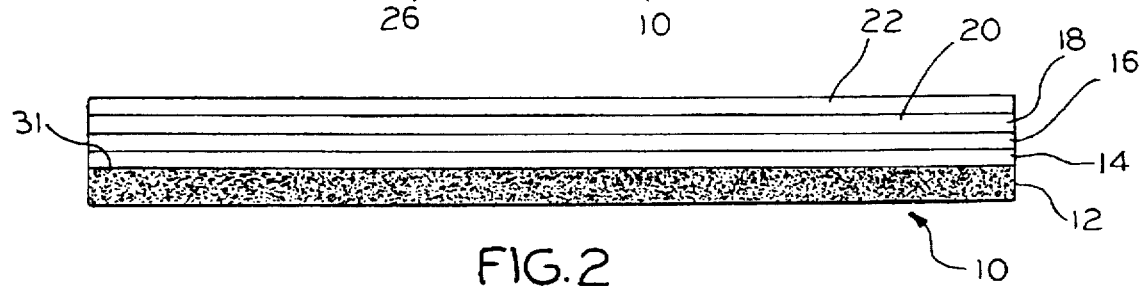
FIG. 2 is a side view of the mouse pad of FIG. 1.
Figure 3:
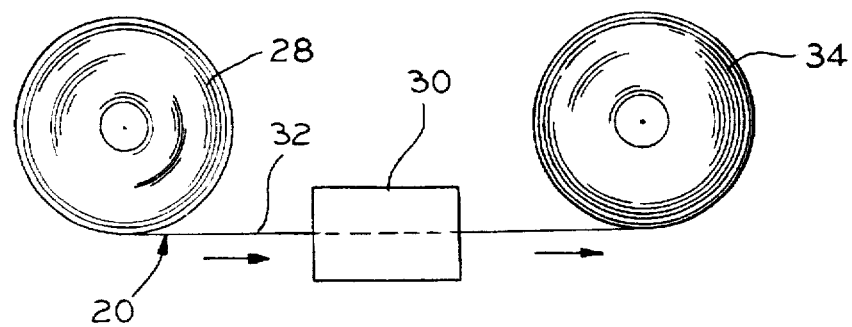
FIG. 3 is a diagram of apparatus used to print images on paper used in the mouse pad shown in FIGS. 1 and 2.
Figure 5:
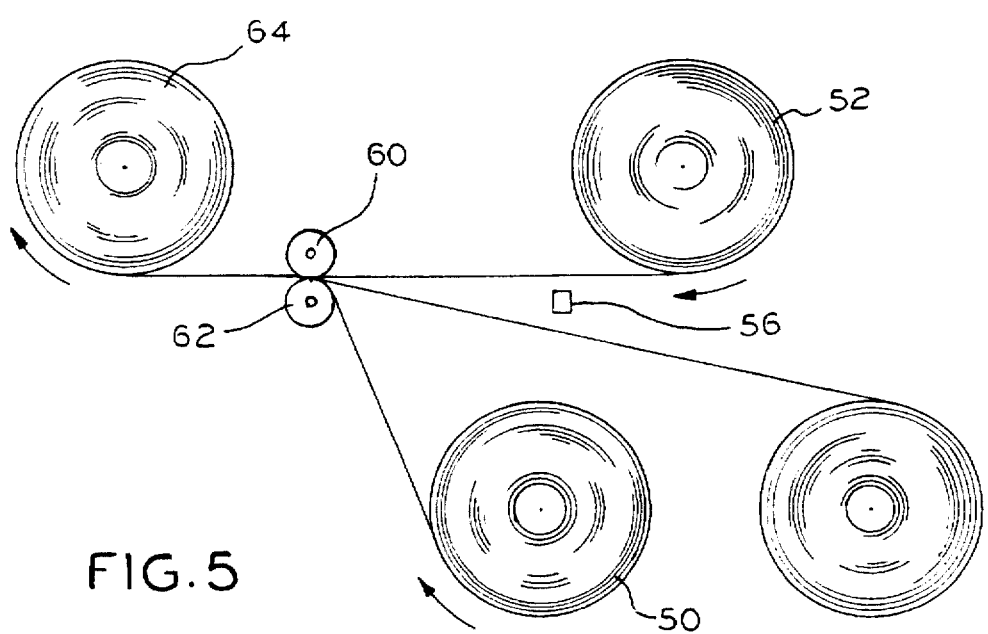
FIG. 5 is a diagram of apparatus used to marry the sub-assembly shown in FIG. 4 with other material used in manufacturing the mouse pad of FIGS. 1 and 2.

As seen in FIGS. 1 and 2, a mouse pad 10 includes a substrate of cushion sponge 12 of a predetermined size and shape, a layer of nylon netting and glue 14 on one side 15 of the cushion sponge 12, a piece of paper 16 such as GRC-700 paper secured to the glue and netting 14 on one side, with pressure sensitive adhesive 18 on the other side. A piece of printed sheet 20 is adhered to the pressure-sensitive adhesive 18. A coating 22 of polymer may be placed over the sheet 20, if desired.

The mouse pad 10 may be any suitable size, such as about 8"×9". The size of the mouse pad 10 is large enough for a computer user to conveniently move a computer mouse 24 on the pad 10. The mouse 24 includes a suspended ball 26 which rolls on the mouse pad 10 in use.

The cushion sponge 12 may be any suitable material which is pliable and has enough cushion so that the ball 26 rolls easily, but accurately, over the top surface of the pad 10. A rubber-like product made by Griswold Mfg. and sold under catalog No. 3120 is preferred, although other products would have suitable performance characteristics, as well.

The nylon netting and glue 14 are also commercially available, and adequately secure the GRC-700 paper to the cushion sponge 12. The printed sheet 20 is preferably a synthetic printing sheet such as Teslin™ sheet material, made by PPG Industries, Inc., 1 PPG Pl., Pittsburgh, Pa. 15272, which prints and fabricates like paper, and has the durability of plastic.

The mouse pad 10 is made using the apparatus shown in FIGS. 3 through 7. A roll 28 of the sheet material 20 is sent through a printer 30, where a succession of images are printed on a side 32 of the sheet material 20. The printed sheet material 20 is then rewound on a first reel 34. The sheet material 20 can be printed with one image across the width of the film or several images across. For example, when a 48 inch roll of sheet material is used, the images can be printed four across.

The printer 30 is preferably a computer-controlled 6-color laser printer because it has been found that when ElectroInk™ liquid ink is used in those printers, the ink bonds well with the Teslin™ sheet material. One such computer controlled printer is the Omnius™ 1 Shot Color™ Digital Offset Color™ press sold by Indigo America, 400 Unicorn Park Drive, Woburn, Mass. 01801. One advantage of using such a printer is that the images can be changed easily and often. Low production runs are economically feasible, and printing is accomplished without films, plates, proofs or make-ready materials and processes.

Figure 4:
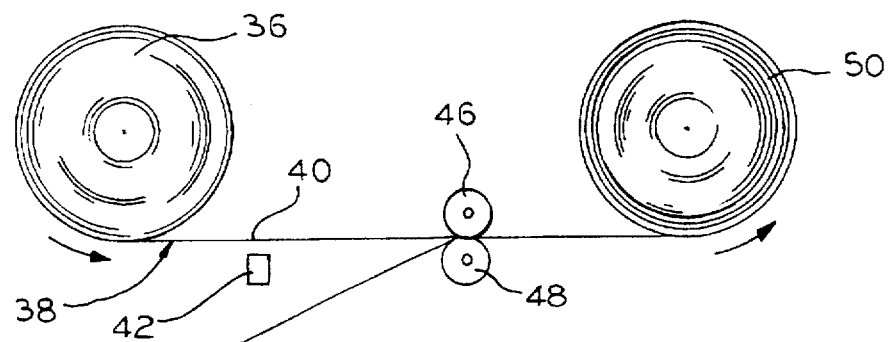
FIG. 4 is a diagram of apparatus used to make a paper sub-assembly used in manufacturing process for the mouse pad shown in FIGS. 1 and 2.

In a separate process, shown in FIG. 4, a roll 36 of paper 38, such as GRC-700 paper, is coated on a side 40 with pressure sensitive adhesive at an adhesive station 42. A roll of removable peel-back material 44 is secured over the adhesive by rollers 46, 48, and the resulting paper sub-assembly is rolled onto a second reel 50.

In a third step in the process (FIG. 5), the cushion sponge 12 is unwound from a roll 52. Glue is placed on a side 54 of the sponge 12 by an adhesive applicator 56. A roll 58 of nylon netting and the second reel 50 are also unwound, and the cushion sponge material 12, the netting and glue 14 and the paper sub-assembly 50 are married in a pair of rollers 60, 62. The married material is then rolled onto a third reel 64.

Figure 6:
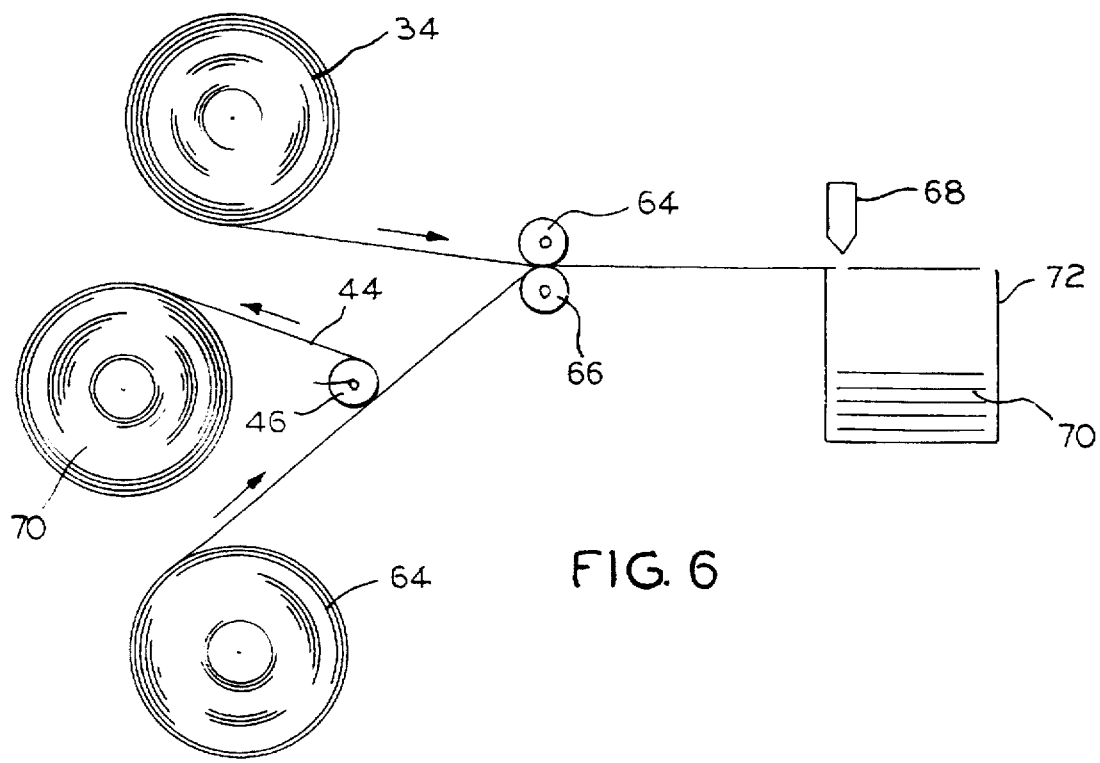
FIG. 6 is a diagram of apparatus used to combine the married material shown in FIG. 5 with the printed paper shown in FIG. 3 to make rough-cut mouse pads.
Figure 7:
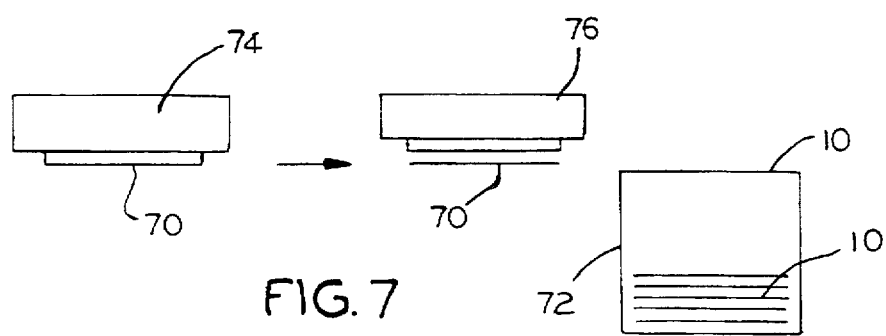
FIG. 7 is a diagram of apparatus used to coat the rough-cut mouse pads of FIG. 6 and die-cut the pads to a desired shape and size.

As seen in FIG. 6, the first reel 34 of pre-printed sheet material 20 is passed through a pair of rollers 64, 66. The third reel 64 is also unwound, and the peel-back material 44 is removed at a station 68. The station 68 may include a roller, a blade or any other suitable device. The peel-back material 44 is rolled onto a reel 70.

The sponge material rubber 12 and GRC-700 paper are passed between the nip rollers 64, 66 with the pre-printed sheet material 20 so that the sheet material 20 adheres to the pressure sensitive adhesive 18 on the GRC-700 paper 16. The combined material is slit and cut to a predetermined size and width at a cutting station 68 to make rough cut mouse pads 70, which are stacked in a bin 72.

The rough cut mouse pads 70 may be coated with polymer or the like at a coating station 74 (FIG. 7), and the pads 70 may be cut to the exact desired size and shape at a die-cutting station 76, to make the finished mouse pads 10. The finished mouse pads 10 may then be stacked in a bin 72.

The many advantages of this invention are now apparent. The mouse pad does not tend to curl in use, and a variety of images may be printed on the mouse pads in low production runs, permitting personalization in small or large quantities. Each printed pad can have a unique image printed alphabetically, numerically or by any other desired pre-sorted logic.

While the principles of the invention have been described above in connection with specific apparatus and applications, it is to be understood that this description is made only by way of example and not as a limitation on the scope of the invention. For example, the process by which the mouse pads are made has been described as a series of separate processes, these parts could be combined into continuous processes, if desired.

I claim:

1. A pad for a computer mouse comprising a piece of cushion sponge material of a predetermined size and shape,
    a layer of netting and glue covering one side of said piece of cushion sponge material,
    a piece of paper adhered to said glue over said netting,
    a layer of adhesive on a side of said paper opposite to said glue and said netting, and
    synthetic sheet material adhered to said adhesive, said synthetic sheet material having a printed image.

2. The pad of claim 1 comprising a coating of polymer over said synthetic sheet material.

\* \* \* \* \*